(12) United States Patent
Peter

(10) Patent No.: US 6,414,464 B2
(45) Date of Patent: Jul. 2, 2002

(54) AUTOMOTIVE POWER SUPPLY WITH PULSE WIDTH MODULATION OF A SEMICONDUCTOR SWITCH

(75) Inventor: Cornelius Peter, Bühl (DE)

(73) Assignee: TRW Automotive Electronics & Components GmbH & Co. KG, Rodolfzell (DE)

( * ) Notice: Subject to any disclaimer, the term of this patent is extended or adjusted under 35 U.S.C. 154(b) by 0 days.

(21) Appl. No.: 09/726,668

(22) Filed: Nov. 29, 2000

(30) Foreign Application Priority Data

Dec. 2, 1999 (DE) .......................... 199 58 098

(51) Int. Cl.$^7$ ............................................. H01M 10/46
(52) U.S. Cl. ............................................. 320/104
(58) Field of Search ...................... 323/267, 282, 323/907, 284; 320/103, 104

(56) References Cited

U.S. PATENT DOCUMENTS 6,144,110 A * 11/2000 Matsuda et al.

* cited by examiner

*Primary Examiner*—Edward H. Tso
(74) *Attorney, Agent, or Firm*—Tarolli, Sundheim, Covell, Tummino & Szabo L.L.P.

(57) ABSTRACT

The automotive electric power supply includes a rechargeable battery and a distributor comprising an input for one battery terminal and several outputs furnishing the battery voltage for various consumers. Arranged between the input for one battery terminal and the outputs are semiconductor switches driven by a digital controller. The controller has an input interface for sensor signals representing operating parameters. The power supply is smart in ensuring that electrical energy is furnished to the various consumers in the vehicle only as required.

23 Claims, 3 Drawing Sheets

Magnoresistive Current Sensing

Starter diagnosis

Optimized charging current

Alternator Diagnosis

AUTOMOTIVE POWER SUPPLY WITH PULSE WIDTH MODULATION OF A SEMICONDUCTOR SWITCH

FIELD OF INVENTION

The present invention relates to an automotive electric power supply.

BACKGROUND OF THE INVENTION

The electrical energy needed in vehicles for powering the various electrical consumers is taken from a rechargeable battery which is charged by an alternator from operation of the internal combustion engine. One of the battery terminals is directly connected to vehicle ground, the other battery terminal, generally the positive terminal, is fed to various consumers via a distributor including several outputs and integrated fuses.

BRIEF SUMMARY OF THE INVENTION

The invention provides an automotive electric power supply which is smart in optimizing the energy reserve made available by the rechargeable battery according to the demands. In accordance with the invention, between the input for one battery terminal and at least one of the outputs of the distributor, a semiconductor switch is connected which is driven by an electronic controller; the controller has an input interface for sensor signals representing operating parameters. The controller is thus active in controlling the consumer(s) connected to the output provided with a semiconductor switch. This control may involve power ON/OFF as required or also modulation, more particularly pulse width modulation.

In one particularly advantageous embodiment of the invention at least the one output connected to the vehicle lighting formed substantially by incandescent bulbs is regulated by pulse width modulation to a voltage value as defined effective for the incandescent bulbs. Now, the charging voltage supplied by the alternator for the rechargeable battery no longer needs to be limited to a value, taking into account the life of the incandescent bulbs, which is sigificantly lower than the optimum charging voltage under certain operating conditions.

It is further provided for in the preferred embodiment to generate a parameter representing the charge condition of the rechargeable battery by permanently monitoring the charging/discharging currents and integrating the current values as sensed. Depending on the charge condition of the battery the various consumers can then be supplied from the rechargeable battery according to a priority scheme. This concept enables essential functions to be maintained over an extended time period when the battery is low so that the vehicle can remain operative longer, for example, when the alternator is down.

BRIEF DESCRIPTION OF THE DRAWINGS

Further features and advantages of the invention read from the following description and are evident from the drawings to which reference is made and in which.

DETAILED DESCRIPTION OF THE INVENTION

Figure 1:
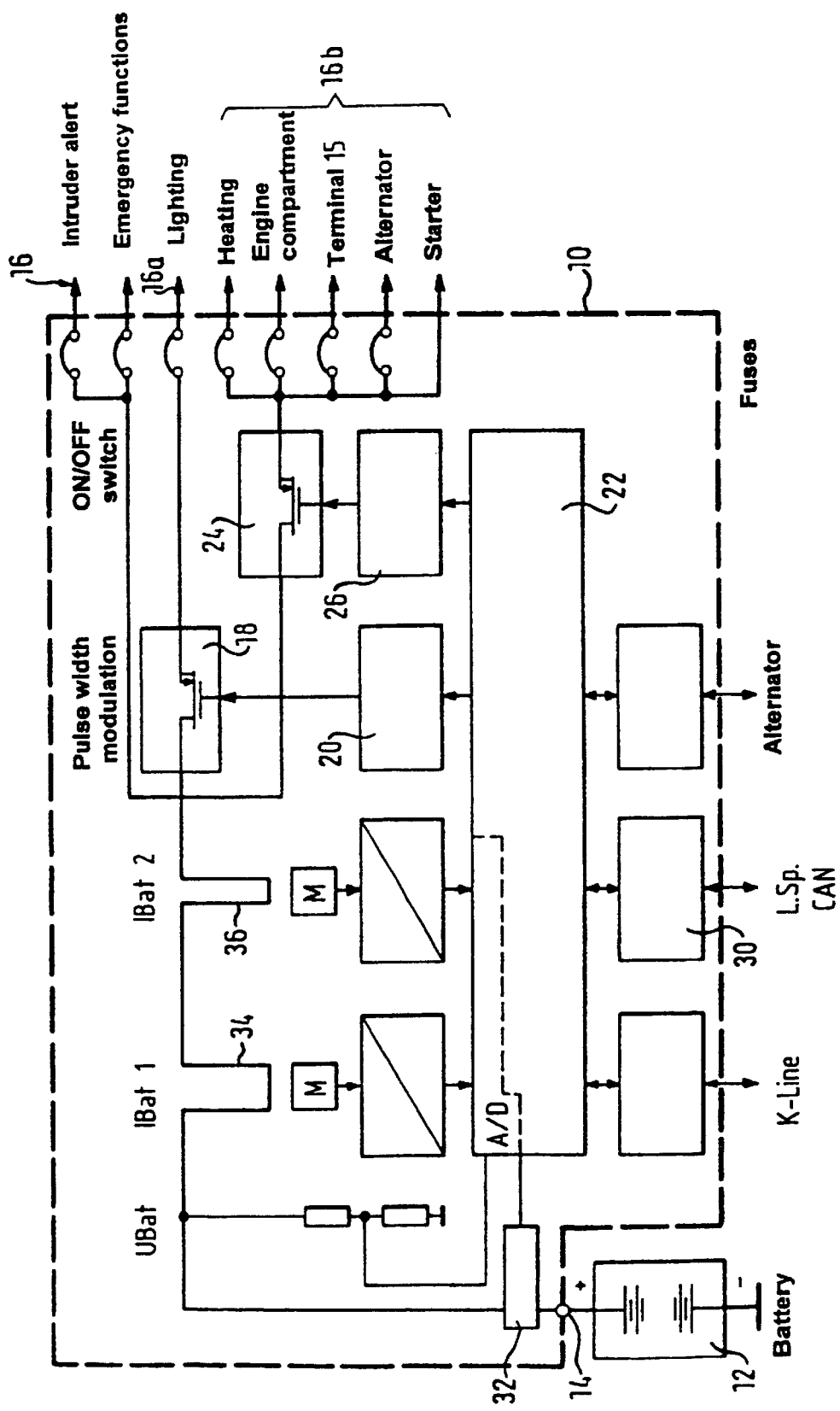
FIG. 1 is a block diagram of the electric power supply.

Referring now to FIG. 1 there is illustrated a power supply incorporated in a housing 10 mounted on the rechargeable battery 12, preferably directly next to the positive terminal. The power supply has an input 14 directly connected to the positive terminal of the battery. Furthermore, the power supply has a series of outputs 16 to which the various consumers are connected. In the embodiment as shown in FIG. 1 all outputs 16, except for the output provided for the starter, are safeguarded by an upstream fuse. The output identified 16a is provided for connecting the vehicle lighting, primarily comprising incandescent bulbs. Included upstream of this output 16a is a semiconductor switch 18. This semiconductor switch 18 is driven by means of a driver circuit 20 from a digital controller 22. By pulse width modulating the output 16a an operating voltage is furnished whose rms value is limited to the operating voltage of the incandescent bulbs used in the vehicle lighting system.

Upstream of the group of outputs identified 16b in FIG. 1 a semiconductor switch 24 is inserted. This semiconductor switch 24 is driven by a driver circuit 26 controlled by the digital controller 22. Since the starter is connected to one of the outputs, 16b, the semiconductor switch 24 is provided with a very low impedance by connecting several semiconductor elements in parallel, an impedance of less than 0.5 mΩ being achievable at 25° C. by connecting eight MOSFET type semiconductor switches in parallel.

At the input end the driver circuit 22 has a plurality of interfaces for connecting analog and digital signals representing the various operating parameters, also belonging thereto being an interface 30 for connecting a bidirectional bus system (CAN).

Figure 2:
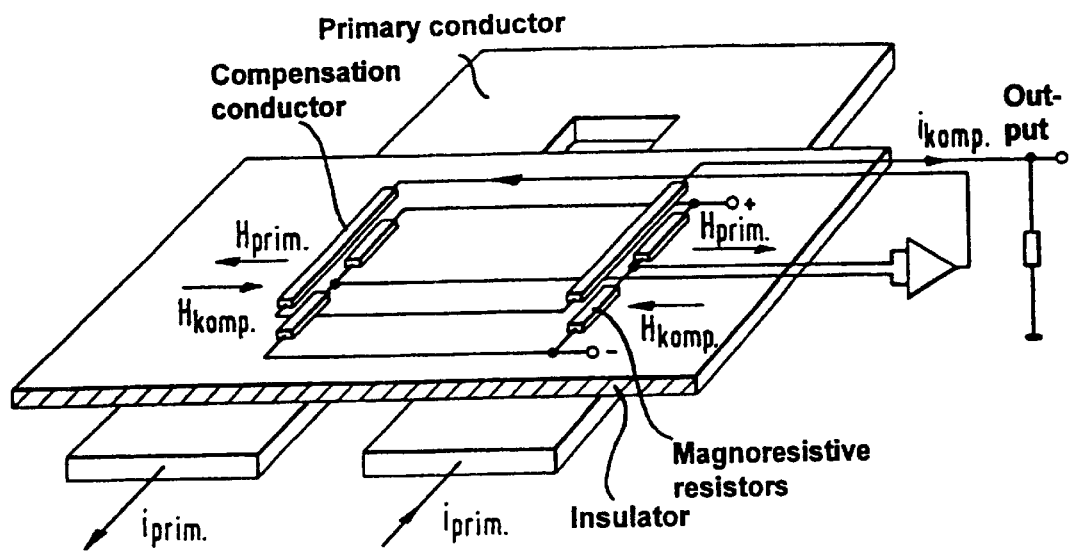
FIG. 2 is a schematic illustration of a means for current sensing by means of magnetoresistive elements.

In optimizing the charging voltage two variables need to be taking into account, namely the internal temperature of the rechargeable battery and its charge condition, the temperature on the rechargeable battery directly adjacent to the positive terminal being adequately representative of the internal temperature. In the power supply in accordance with the invention a temperature sensor 32 in the form of an NTC resistor is arranged directly adjacent to the positive terminal of the rechargeable battery and connected to an A/D input of the driver circuit 22. The charge condition of the rechargeable battery is sensed by permanently monitoring the charging/discharging currents and integrating the values sensed. Sensing is done preferably in two successive ranges covering a total range of 0.1 A to 800 A (80 dB). For this purpose two sensing loops 34, 36 are provided on which magnetoresistive elements are arranged as shown in FIG. 2.

Figure 3:
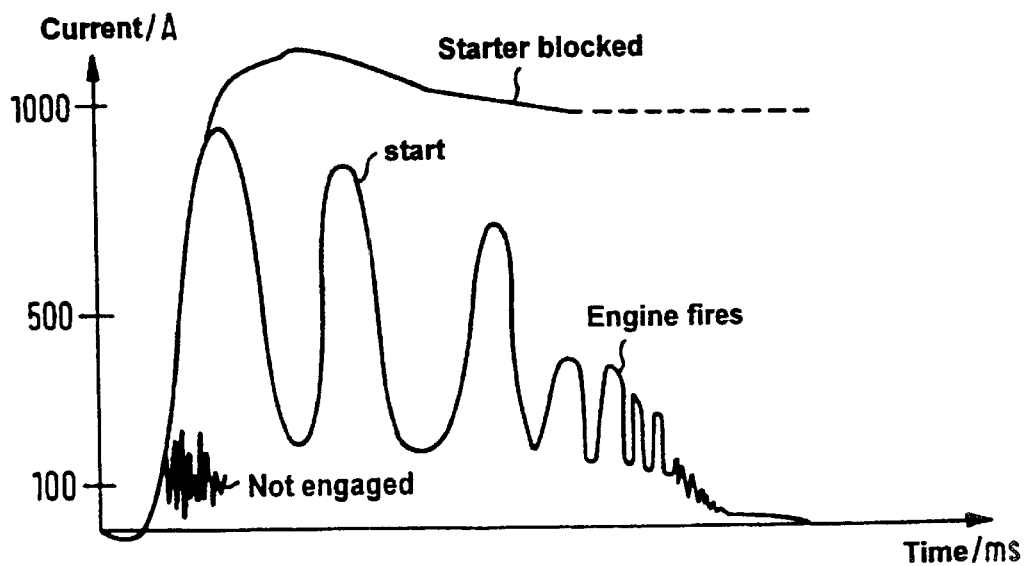
FIG. 3 is a graph plotting starter current with time for various operating conditions.

Referring now to FIG. 3 there is illustrated the preferred embodiment employed for current sensing in a diagnostic application by plotting the starter current as an example.

Figure 4:
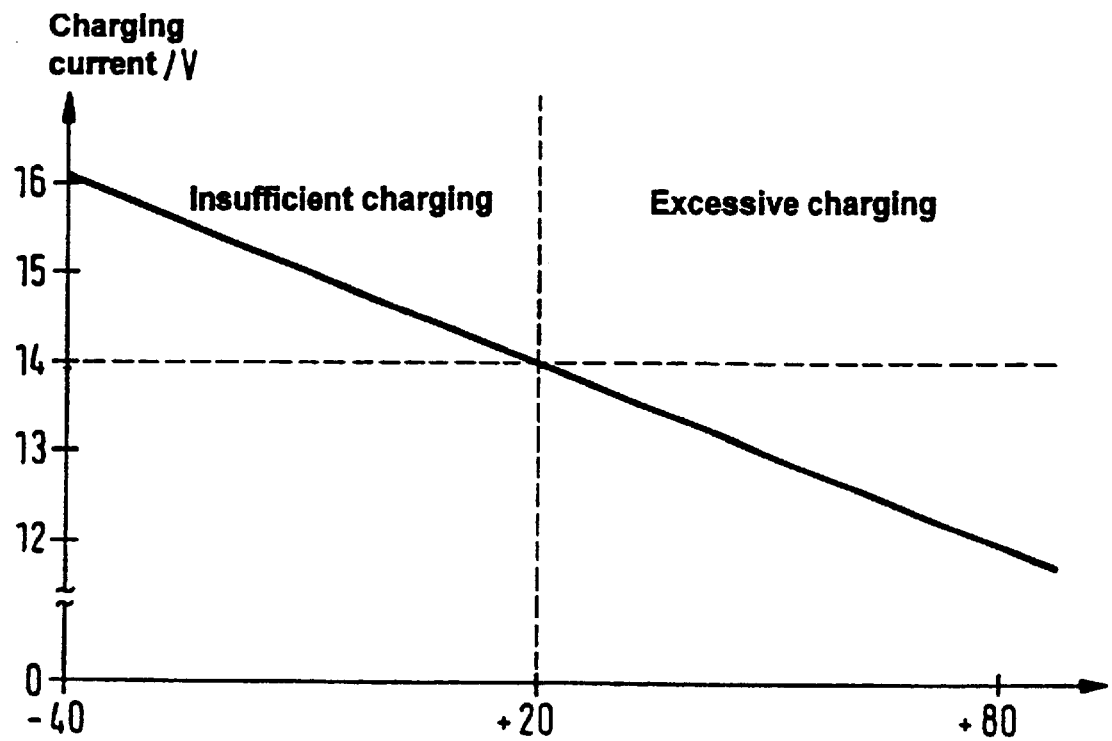
FIG. 4 is a graph plotting the charging condition.

Referring now to FIG. 4 there is illustrated how the charge condition is optimized without needing to take into account the limitations imposed by the incandescent bulbs of the vehicle lighting system or the like.

Figure 5:
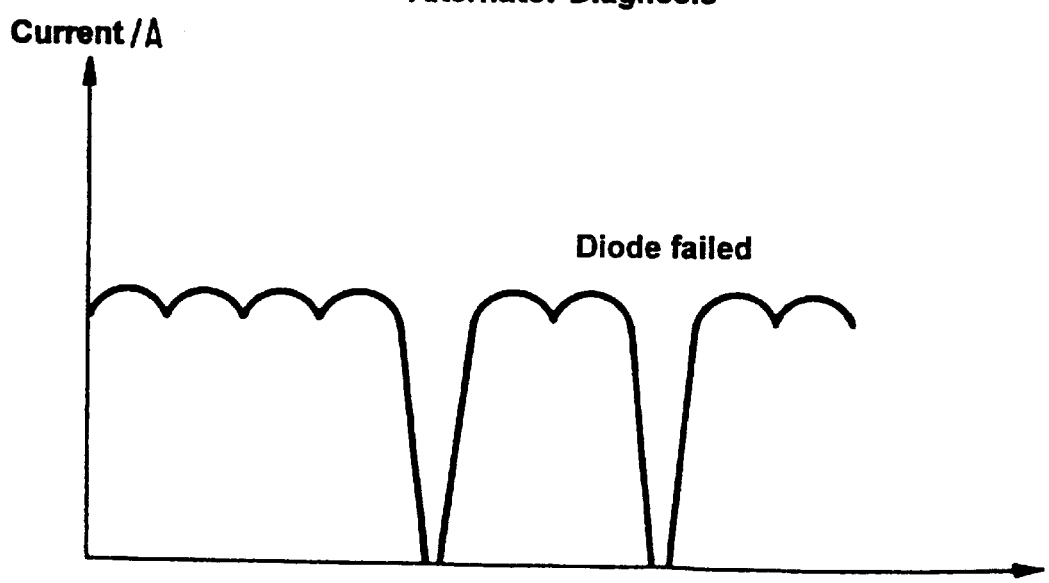
FIG. 5 is a graph plotting the current furnished by the alternator after rectification.

Referring now to FIG. 5 there is illustrated as a further example of the function achieved by the power supply in accordance with the invention in diagnosing the condition of the alternator by plotting the alternator current in which the periodic voltage drops sigify defective rectifier diodes.

The performance features made available by the power supply in accordance with the invention can be classified in four groups:

1. Battery Management
    charge condition by current integration
    optional indication of charge condition
    optimized charging voltage (temperature, charge condition, useful life)
    voltage regulation for all incandescent bulbs, preferably by pulse width modulation at approx. 90 Hz.

This first group of performance features ensures reliable battery charging in all temperature ranges. More particularly the standby charge level can be increased for low temperatures, ultimately achieving longer life for both the incandescent bulbs of the vehicle lighting and the rechargeable battery itself.

2. Consumers Management
    reducing consumption with priority control on the basis of operating parameters polled via a bus system (CAN)
    two output modes: ignition ON and ignition OFF
    adapting idling speed (fallup at low charge condition)
    limiting starter active time (preventing misuse)

These performance features enhance the available standby charge levels.

3. Safety Functions
    short-circuit protection for starter
    power OFF in an emergency (crash situation)
    power OFF when intruder alarm system activated
    power OFF during transport These performance features enhance safety and security.

4. Diagnostic Functions
    starter blocked, pinion not engaged
    alternator regulator, diode defect
    leakage currents This group of performance features provides an optimum tool for checking the vehicle electrics system.

What is claimed is:

1. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and wherein one of said outputs is pulse width modulated for driving the semiconductor switch.

2. The power supply as set forth in claim 1, wherein the pulse width modulated output is regulated to a maximum rms voltage.

3. The power supply as set forth in claim 2, wherein a charging voltage for the rechargeable battery is adjusted by a charge controller to a value optimized for criteria such as standby change level, operating temperature, charging condition and life, but irrespective of the withstand voltage of one or more consumers connected to the pulse width modulated output.

4. The power supply as set forth in claim 1, wherein incandescent bulbs of a vehicle lighting system are connected to the pulse width modulation output.

5. The power supply as set forth in claim 4, wherein the pulse width modulation has a frequency exceeding 50 Hz, preferably in the range of 90 Hz.

6. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameter, and wherein by permanently sensing the consumer and charging currents and integrating current values sensed a characteristic indicating a charge state is generated.

7. The power supply as set forth in claim 6, wherein current sensing is done directly following said battery terminal in a plurality of adjacent current ranges.

8. The power supply as set forth in claim 6, wherein sensing the current is done by means of magnetoresistive elements.

9. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, wherein a sensed consumer current is analyzed for the purpose of diagnosing a condition of the respective consumer.

10. The power supply as set forth in claim 9, wherein from a starter current diagnostic information as to at least one of the following conditions is derived:
    starting
    engine firing
    pinion not engaged
    blocking.

11. The power supply as set forth in claim 8, wherein the sensed charge state is analyzed for the purpose of diagnosing a condition of the alternator.

12. The power supply as set forth in claim 11, wherein from periodic voltage drops in the charging voltage an indication is derived as to a defective rectifier diode of the alternator.

13. The power supply as set forth in claim 6, comprising a means for indicating a charge condition of the rechargeable battery.

14. The power supply as set forth in claim 6, comprising a means for detecting leakage currents.

15. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and wherein a temperature sensor connected to an A/D input of the controller is provided adjacent a positive terminal of the rechargeable battery.

16. an automotive electric power supply including a rechargeable battery and a distributor comprising an input for one of two battery terminal and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and wherein a bidirectional bus system (CAN) is connectable to the input interface.

17. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and comprising power OFF means in an emergency.

18. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and comprising power OFF means on intruder alarm.

19. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and comprising power OFF means for safe transport.

20. An automotive electric power supply including a rechargeable battery and a distributor comprising an input for one of two battery terminals and a plurality of outputs furnishing a battery voltage for a plurality of consumers, wherein a semiconductor switch is arranged between an input for said one battery terminal and at least one of said outputs and is driven by an electronic controller, said controller having an input interface for sensor signals representing operating parameters, and wherein a selective reduction in consumer current of at least one current consumer is controlled by the controller as a function of operating parameters.

21. The power supply as set forth in claim 20, wherein one of the operating parameters taken into account is the condition of the ignition switch.

22. The power supply as set forth in claim 6, wherein when the charge condition is low the idling speed of the internal combustion engine driving the alternator and the vehicle is raised.

23. The power supply as set forth in claim 6, wherein an ON duration of the starter is limited as controlled by the controller.

* * * * *

UNITED STATES PATENT AND TRADEMARK OFFICE
CERTIFICATE OF CORRECTION

PATENT NO.     : 6,414,464 B2
DATED          : July 2, 2001
INVENTOR(S)    : Cornelius Peter It is certified that error appears in the above-identified patent and that said Letters Patent is hereby corrected as shown below:

Column 4,
Line 34, change "8" to -- 6 --.

Signed and Sealed this

Seventh Day of January, 2003

JAMES E. ROGAN
*Director of the United States Patent and Trademark Office*